Dec. 20, 1927.

I. W. LITCHFIELD 1,653,051

METHOD OF AND MACHINE FOR CLOSING FLEXIBLE CONTAINERS

Filed July 19, 1926  6 Sheets-Sheet 1

Inventor
Isaac W. Litchfield
By Mauro, Cameron, Lewis & Kerkam
Attorneys

Dec. 20, 1927.

I. W. LITCHFIELD 1,653,051

METHOD OF AND MACHINE FOR CLOSING FLEXIBLE CONTAINERS

Filed July 19, 1926   6 Sheets-Sheet 2

Inventor
Isaac W. Litchfield
BY Mauro, Cameron, Lewis & Kerkam
Attorneys

Dec. 20, 1927.
I. W. LITCHFIELD
1,653,051
METHOD OF AND MACHINE FOR CLOSING FLEXIBLE CONTAINERS
Filed July 19, 1926      6 Sheets-Sheet 3
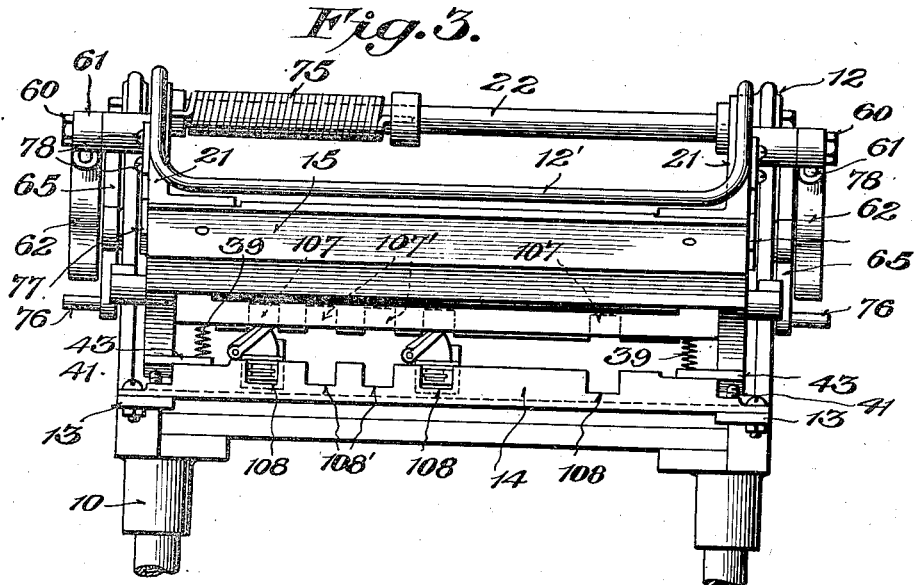
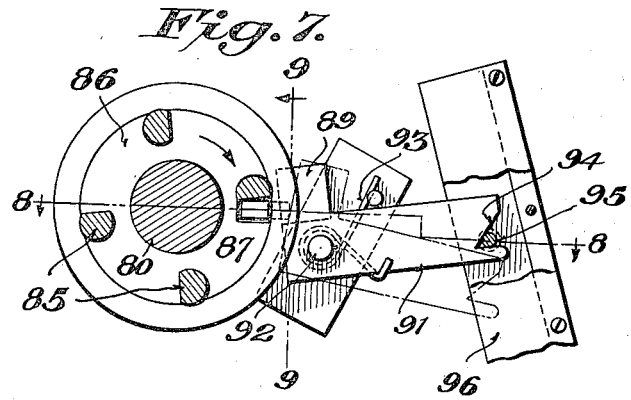
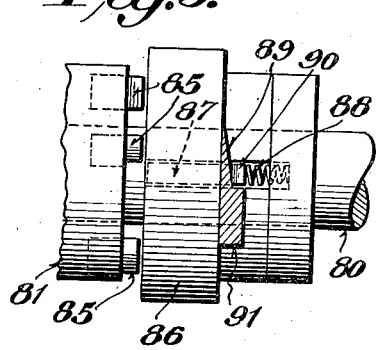
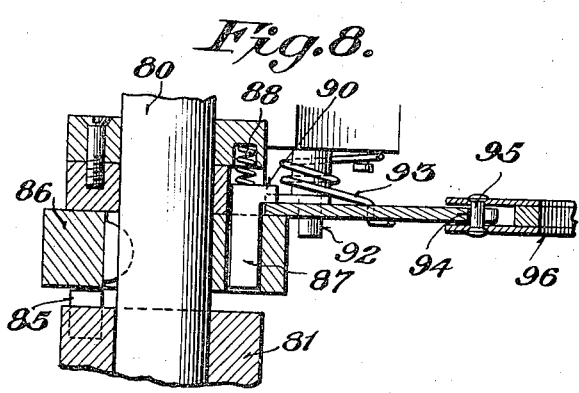
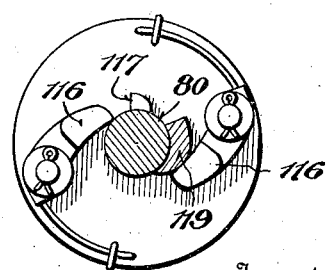
Inventor
Isaac W. Litchfield
By Mauro, Cameron, Lewis & Massam
Attorneys Dec. 20, 1927.  I. W. LITCHFIELD  1,653,051
METHOD OF AND MACHINE FOR CLOSING FLEXIBLE CONTAINERS
Filed July 19, 1926   6 Sheets-Sheet 4
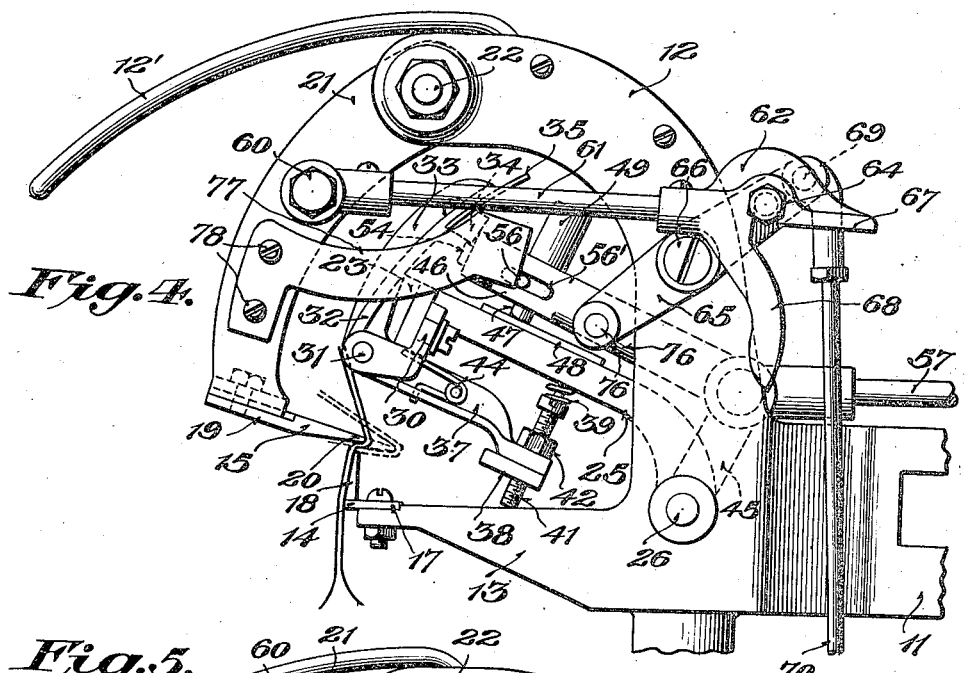
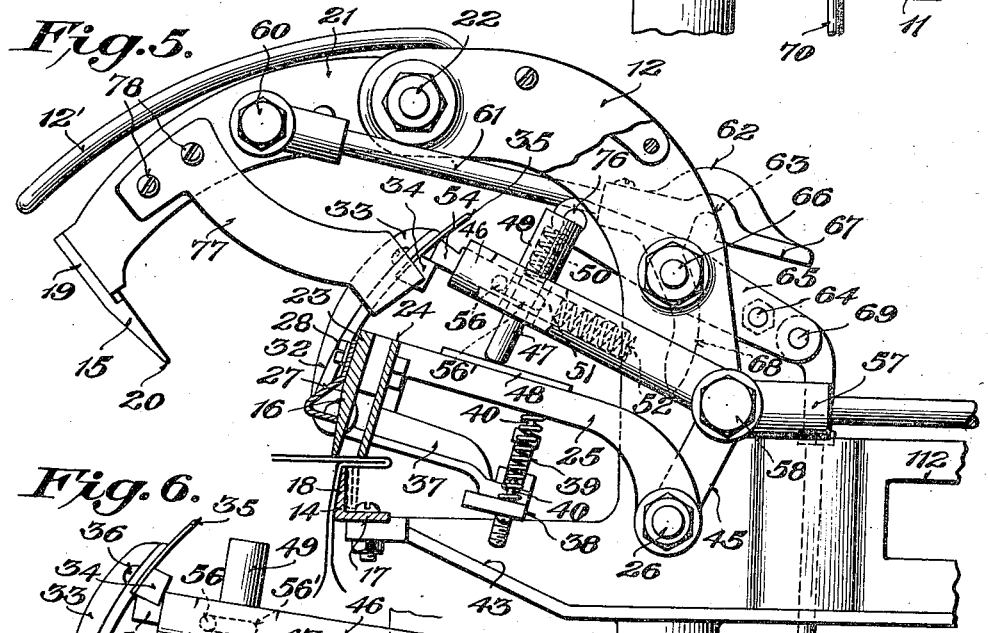
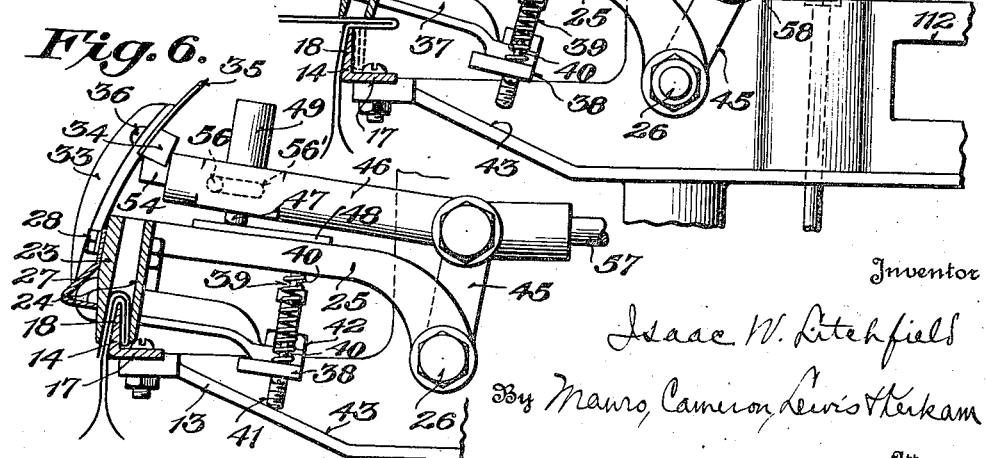
Inventor
Isaac W. Litchfield
By Mauro, Cameron, Lewis & Kerkam
Attorneys Dec. 20, 1927.
I. W. LITCHFIELD
1,653,051
METHOD OF AND MACHINE FOR CLOSING FLEXIBLE CONTAINERS
Filed July 19, 1926  6 Sheets-Sheet 5
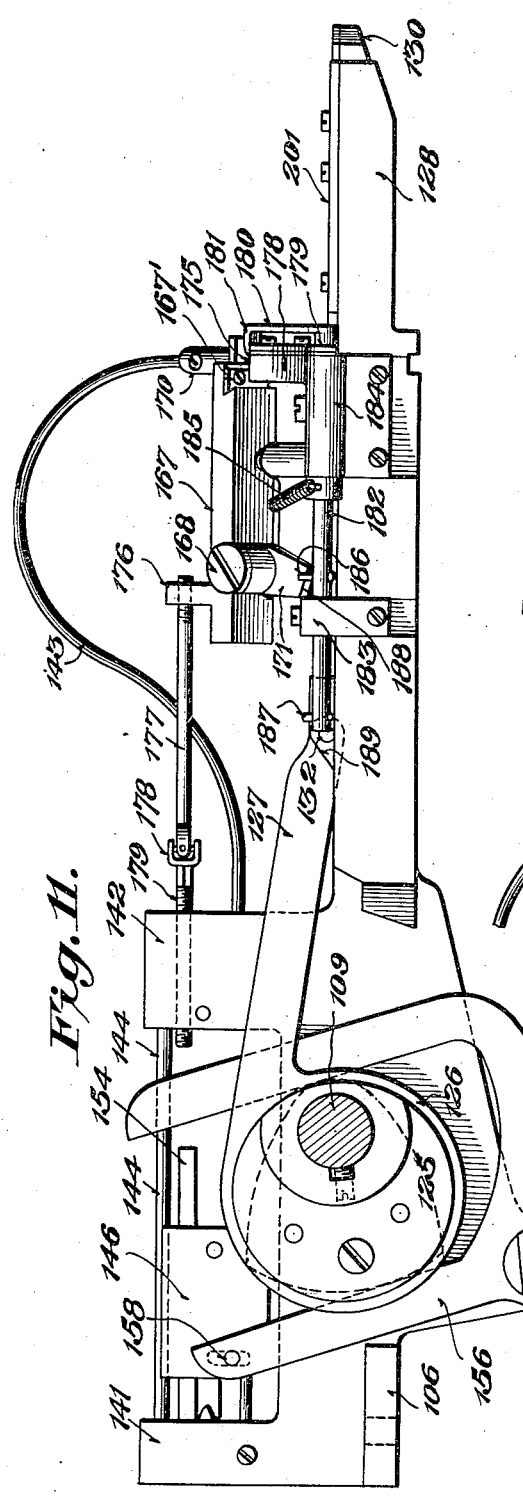
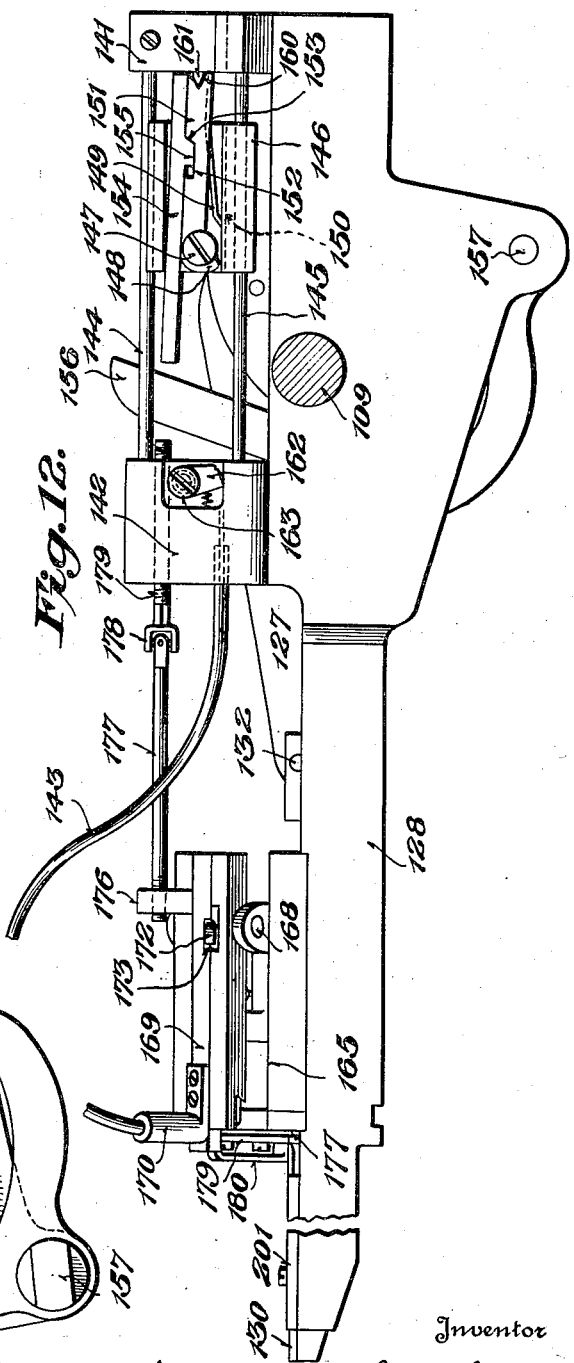
Inventor
Isaac W. Litchfield
By Mauro, Cameron, Lewis & Kerkam
Attorneys Dec. 20, 1927.
I. W. LITCHFIELD
1,653,051
METHOD OF AND MACHINE FOR CLOSING FLEXIBLE CONTAINERS
Filed July 19, 1926  6 Sheets-Sheet 6
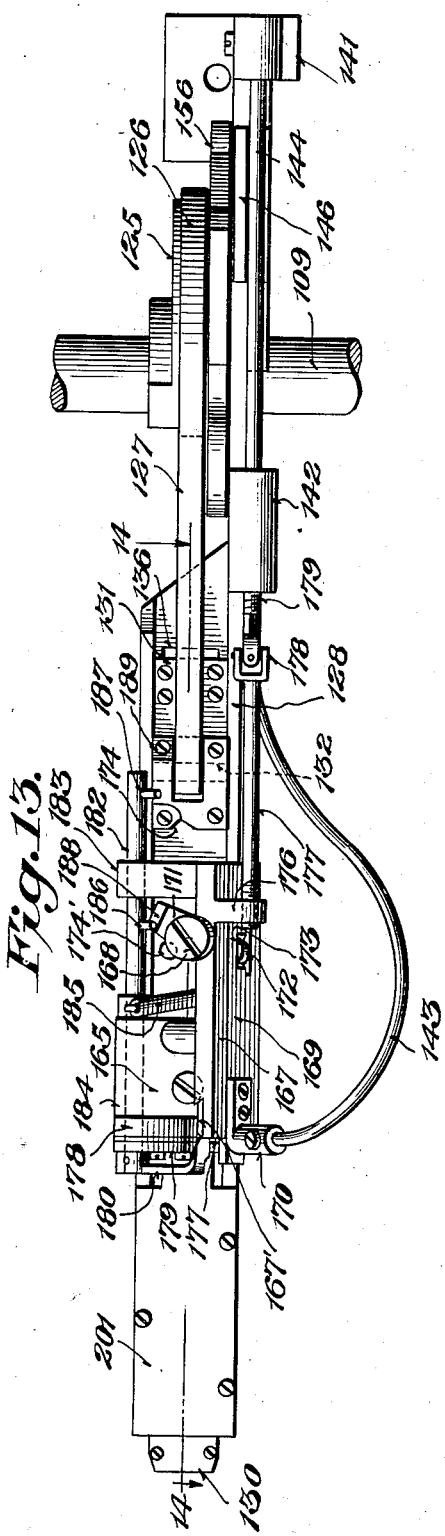
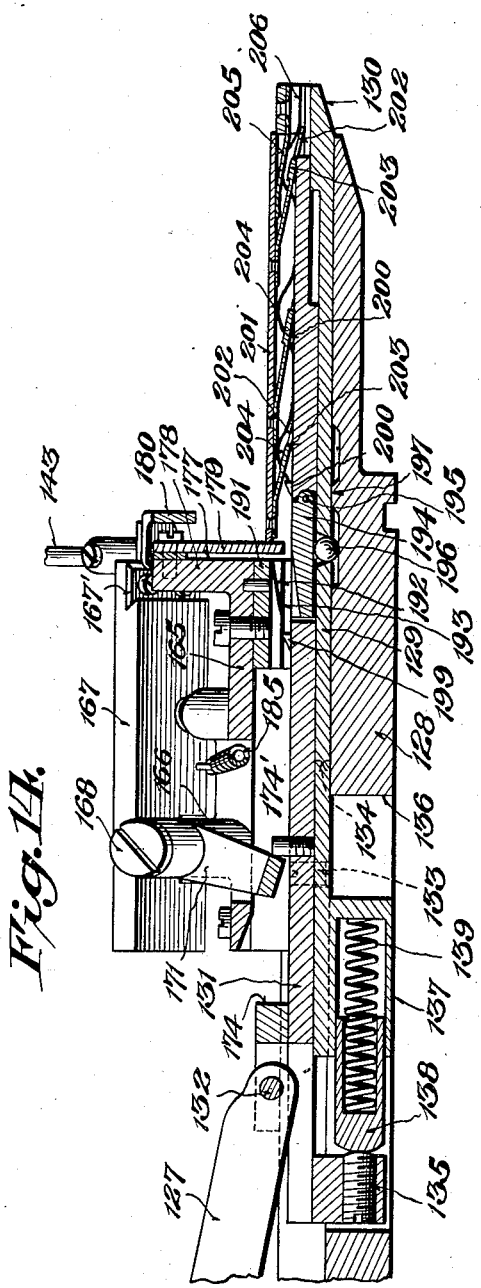
Inventor
Isaac W. Litchfield
By Mann, Carney, Lewis & Kerkam
Attorneys Patented Dec. 20, 1927.

1,653,051

UNITED STATES PATENT OFFICE.

ISAAC W. LITCHFIELD, OF BOSTON, MASSACHUSETTS, ASSIGNOR TO BEMIS BRO. BAG CO., OF NEW YORK, N. Y., A CORPORATION OF MISSOURI.

METHOD OF AND MACHINE FOR CLOSING FLEXIBLE CONTAINERS.

Application filed July 19, 1926. Serial No. 123,527. REISSUED

This invention relates to a method and machine for closing flexible containers of any suitable material and construction, such containers hereinafter being designated bags for convenience.

It is an object of this invention to provide a novel method of closing bags whereby a strong, tight closure may be rapidly effected, and one that is susceptible of being carried out at high speed by machinery, although if desired the method may be carried out by hand.

Another object of this invention is to provide a method of closing bags whereby the closure is of a character that will prevent the sifting of finely pulverized material and whereby the material of the bag will be disposed in reenforcing relation to the walls of the bag at the closure, so as to minimize the likelihood of the bag being broken open at the closure by the rough handling to which bags are frequently subjected.

Another object of this invention is to provide a machine for closing bags which will effect a strong, tight closure at high speed.

Another object of this invention is to provide a bag-closing machine capable of running at high speed which will effect a closure that prevents the sifting of finely pulverized material and which disposes the material of the bag in reenforcing relation to the walls of the bag at the closure, so as to minimize the likelihood of the wall of the bag being broken open at the closure by the rough usage to which bags are frequently subjected.

Another object of this invention is to provide a machine for closing bags which is of simple and rugged construction and capable of being operated without danger by comparatively unskilled labor.

Another object of this invention is to provide a method and machine for closing bags whereby the material of the bag may be rapidly folded into a strong, tight, reenforced closure and simultaneously secured in folded position at a plurality of points along the length of the fold, which points may be closer together than heretofore obtained, and also relatively close to the contained material to conserve bag material and secure a compact bundle.

Another object of this invention is to provide a method and machine for closing bags whereby the material of the bag may be rapidly folded into a strong, tight, reenforced closure and simultaneously secured in folded position at a plurality of points along the length of the fold by stapling mechanism of improved construction and operating at high speed.

Other objects of the invention will appear as the description of the machine and method proceeds.

One embodiment of the present invention is illustrated on the accompanying drawings, but it is to be expressly understood that the drawings are for purposes of illustration only and are not to be construed as a definition of the limits of the invention, reference being had to the appended claims for that purpose.

Referring in detail to the drawings wherein the same reference characters are employed to designate corresponding parts in the several figures:—

Fig. 3 is a front end view of the folding mechanism from the operator's position.

Figs. 4, 5 and 6 are fragmentary views of the folding mechanism in successive positions.

Fig. 7 is a sectional view of the main clutch on the line 7—7 of Fig. 2.

Figs. 8 and 9 are sectional views on the lines 8—8 and 9—9, respectively, of Fig. 7.

Figure 2:
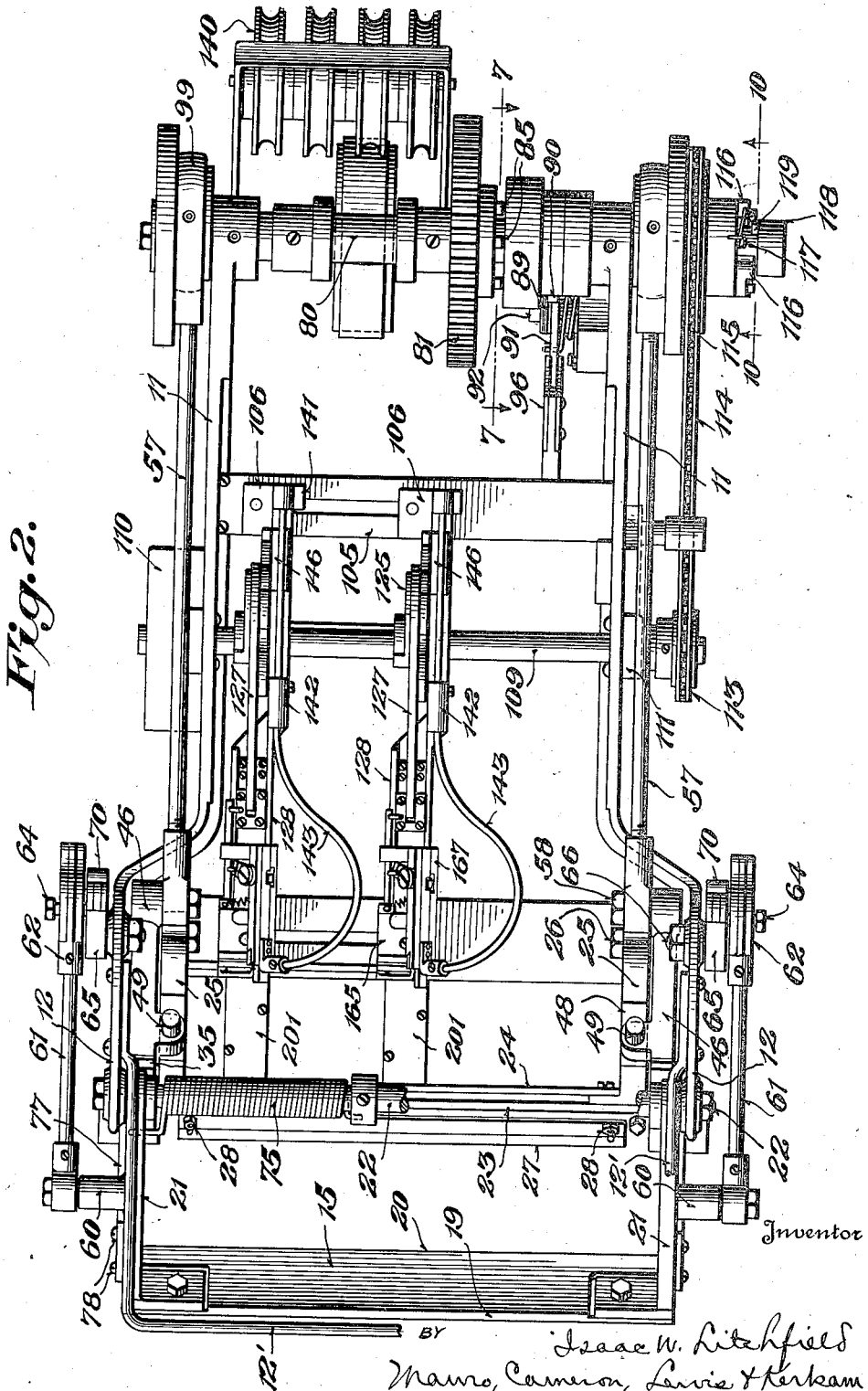
Fig. 2 is a plan view thereof.

Fig. 10 is a sectional view, on the line 10—10 of Fig. 2, showing the clutch mechanism for the stapling mechanism.

Fig. 11 is a side elevation of one of the stapling mechanisms.

Fig. 12 is an elevation of said stapling mechanism viewed from the opposite side.

Fig. 13 is a plan view of said stapling mechanism and

Fig. 14 is an axial section of said stapling mechanism.

In the form shown, the bag-closing machine is illustrated as including an upright frame 10, which may be of any suitable construction, provided at each side of its top with longitudinally extending frame members 11 which carry the folding, the stapling and the driving mechanisms hereinafter described. Each side member 11 has an upwardly and forwardly curved bracket 12, which may carry a guard 12', and a lower horizontal bracket 13. Said brackets carry the folding mechanism.

The folding mechanism, shown particularly in Figs. 1, 4, 5 and 6, is composed of three main folding elements, a stationary folding blade 14, a movable folding blade 15 which is designed to produce a reentrant fold in the lips of the bag across the edge of and at an approximately right angle to the stationary folding blade 14, and a matrix folding blade 16 (see Fig. 5) which will engage and hold down on both sides of the stationary folding blade 14 the sections of the right angularly extending reentrant fold formed by the movable blade 15, so that the material of the bag is finally folded on both sides of the wall of the bag proper, two thicknesses on one side and one on the other, to close the bag and reenforce it at the closure.

The stationary folding blade 14 is suitably supported at its ends on the two brackets 13, being shown as an elongated plate 17 bolted to the brackets 13 and provided at its forward edge with an upstanding tapered rib 18.

The movable folding blade 15 is shown as a plate 19 having a tapered folding edge 20 suitably secured to a pair of arcuate arms 21 pivoted on and at the ends of a brace rod 22 which connects the free ends of the brackets 12. Said rod 22 is substantially vertically above the stationary folding blade 14, and the arms 21 are of such length that when the blade 15 swings downward it crosses adjacent the edge of and at substantially right angles to the stationary folding blade 14.

The matrix folding blade 16 is suitably formed and mounted so as to move down and embrace the stationary folding blade 14. It is shown as composed of a pair of plates 23 and 24 (Figs. 5 and 6) suitably secured, as by bolts, to the opposite faces of the T-shaped ends of a pair of upwardly and forwardly projecting arms 25 which are pivoted at 26 to the side frame members 11 at the base of the brackets 12. Said plates 23 and 24 are spaced by the T-heads of said arms 25, to provide a suitable clearance for the bag material when said plates embrace the stationary folding blade 14, so that the several thicknesses of bag material may be forced down on the two sides of the folding blade 14 without danger of tearing or cutting the bag material. The forward plate 23 is also preferably provided with a guide 27 against which the upper edge of the bag is abutted before the folding operation is commenced. This guide may be of any suitable construction, being shown as a plate bent outwardly at an incline and then inwardly at right angles to the plate 23 and secured to said plate, preferably adjustably, by screws 28 passing through slots in said guide plate.

Figure 1:
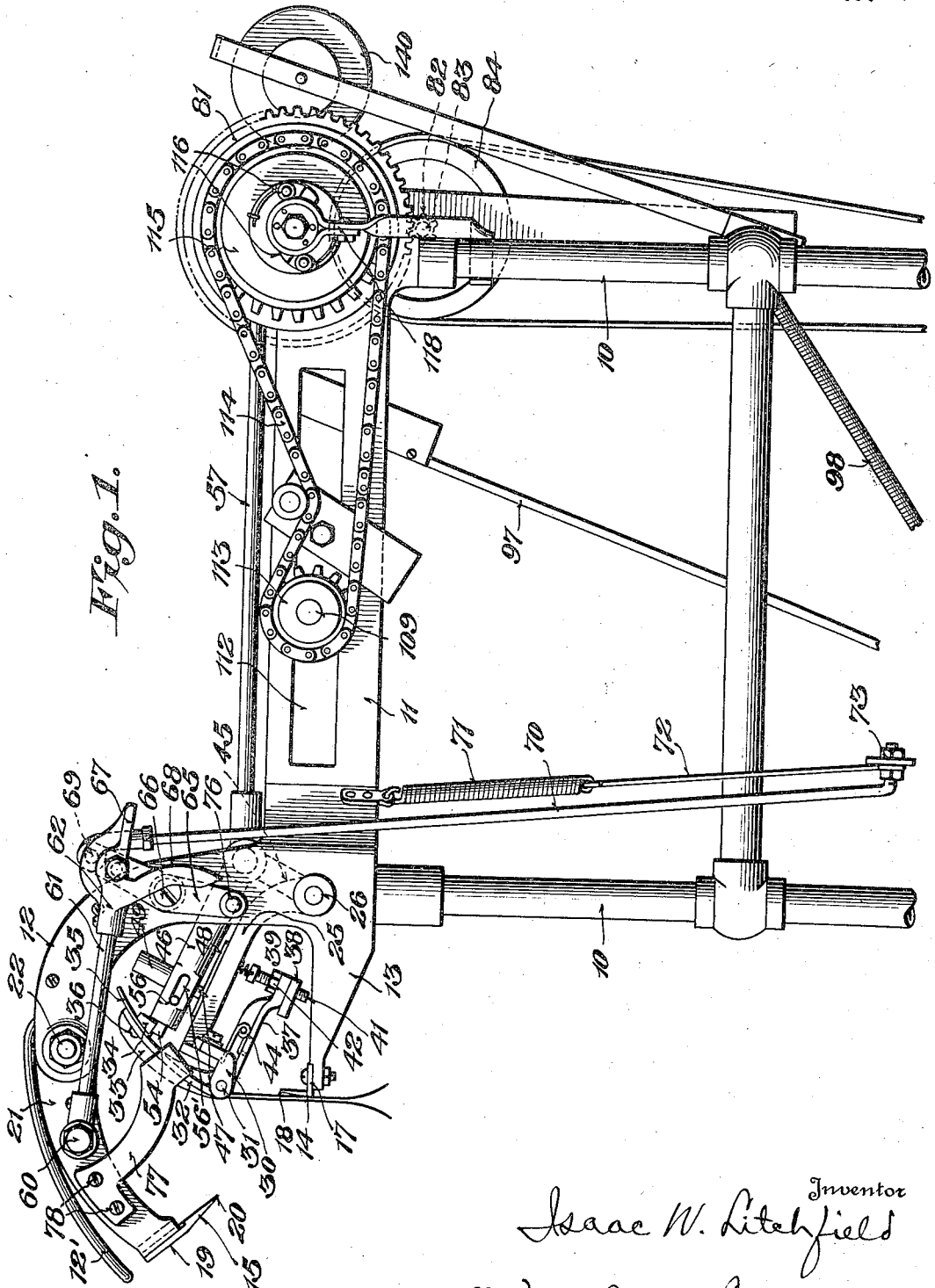
Fig. 1 is a side elevation of an embodiment of the present invention.

Matrix folding blade 16 is normally held in its upper position as shown in Figs. 1 and 4. To this end a depending bracket 30 is suitably secured, as by bolts, to the outer rear face of each of the T-heads on arms 25, and carries at its forwardly projecting end a pivot pin 31. Pivotally mounted on each pivot pin 31 is an L-shaped member 32. One arm 33 of each member 32 extends upwardly and rearwardly and carries a rearwardly projecting lug 34, preferably carried by an adjustable plate 35 suitably secured to the arm 33, as by screws 36 projecting through elongated slots in said plate 35. The other arm 37 of each L-shaped member 32 extends rearwardly and downwardly and has attached to its lower face adjacent the end thereof a laterally projecting plate 38. Interposed between each plate 38 and its corresponding arm 25 is a coil spring 39 suitably centered as by pins 40 (Fig. 6) on said plate and arm. Each arm 37 also carries a stop screw 41 threaded into an aperture provided in said arm and plate 38 and held in adjusted position by a lock nut 42. Each screw 41 projects below its plate 38 and is adapted to engage a ledge 43 (Figs. 5 and 6) on the corresponding bracket 13, for a purpose to be described. A second spring 44 may also be interposed between each bracket 30 and arm 37 to cooperate with each spring 39 in urging the corresponding member 32 in a clockwise direction around its pivot 31.

Also pivoted coaxially with each arm 25 is an L-shaped member 45, the pivot 26 passing through the end of the short arm of the L. The long arm 46 of each L-shaped member 45 extends forwardly and carries a spring-pressed plunger 47 which may engage a wear plate 48 suitably secured to the upper surface of each arm 25. Each plunger 47 is reciprocatably mounted in a housing 49 carried by the corresponding arm 46, and a spring 50 is interposed between each plunger and the inner end of its housing as shown in dotted lines in Fig. 5. Also mounted for longitudinal reciprocating movement in each arm 46 is a second spring-pressed plunger 51, shown in dotted lines in Fig. 5, which is normally urged outwardly by a coil spring 52 interposed between said plunger and the end of the recess in which said plunger is received. The outer end of each plunger is formed into a head 54 suitably shaped to coact at different times with the upper and the lower faces of the corresponding lug 34 as hereinafter explained. Each plunger 51 is guided and limited in its movement by a pin 56 which projects through a slot 56' in the side of arm 46 and forms a trip pin as hereinafter described. A longitudinally extending driving rod 57 is pivotally connected to the angle of each L-shaped member 45 as shown at 58 and extends to power driven mechanism as hereafter explained.

The swinging folder blade 15 carried by the arms 21 is designed to be moved into folding position by the operator, and to this end each arm 21 has pivoted thereto intermediate its length, at 60, a rearwardly extending rod 61 which at its rear end is provided with a bifurcated member 62. Each member 62 has a slot 63 designed to take over a headed pin 64 on a lever 65 pivoted to each bracket 12 at 66. The two arms of each member 62 are shaped at 67 and 68 to provide guide faces to guide member 62 to engage its slot 63 with the corresponding pin 64 under certain conditions of relative movement. Pivotally connected to each lever 65 at 69 is a downwardly extending rod 70 which may extend to suitable treadle mechanism (not shown), said rods 70 and levers 65 being normally held in the position shown in Fig. 1 by one or more coil springs 71 suitably attached to the side frame members 11 at their upper ends and to rods 72 connected to the treadle rods 70 at 73. In this position the pins 64 are engaged in the slots 63 of the members 62, and the swinging folder blade 15 is in its upper position. The swinging folder blade 15 and its carrier arms 21 are also normally retained in their upper position by a coil spring 75 (Figs. 2 and 3) which is coiled around and suitably secured to a collar on the brace rod 22 at one end and secured to one of the arms 21 at its opposite end. When the treadle is depressed the rod 70 is moved downwardly and by the coaction of each pin 64 in its slot 63 the rods 61 are moved to the right as viewed in the drawings, so that the arms 21 and the folder blade 15 are swung downwardly as shown in Fig. 4. At the end of this downward movement it is desirable that the folder blade 15 be returned to its upper position automatically so as to withdraw the same from the path of the matrix folder blade 16 even though the operator's foot is retained on the treadle. Therefore each arm 61 is automatically disengaged from its moving mechanism heretofore described by disengaging the member 62 from the pin 64 when the folder blade reaches its downward limit of movement. To this end each lever 65 is provided, at its end opposite from the pin 64, with a laterally extending pin 76 which is adapted to engage and lift the corresponding rod 61 (see Fig. 5) so as to free the member 62 from pin 64. Thereupon spring 75 automatically restores the arms 21 with their attached blade 15 to its upper position, in which position the members 62 are reengaged with the pins 64 when the treadle is released and the levers 65 return to normal position.

The matrix folder blade 16 is normally held in its upper inoperative position by the engagement of the heads 54 of plungers 51 under the lugs 34 on the members 32 carried by said blade, and downward movement of the swinging folder blade 15 effects the release of said matrix folder blade 16. To this end each of the arms 21 carries a rearwardly extending trip member 77, suitably secured thereto as by screws 78, and the rear end of each trip member 77 is designed to engage the corresponding pin 56 on plunger 51, just as the folder blade 15 is completing its rearward travel, as shown in Fig. 4. As the trip members 77 press in the plungers 51 against their springs 52 the heads 54 of said plungers are withdrawn from under the lugs 34 on the L-shaped members 32, and the matrix folder blade 16 is therefore free to drop by its own weight and the action of the spring-pressed plungers 47. The falling matrix blade 16 engages the upper layer of the reverse fold produced by the blade 15 just before said blade 15 is withdrawn from the fold, and thereby said blade 16 acts to retain the folded material in its folded position as the swinging blade 15 moves out from between the layers of the fold under the action of its spring 75. The parts are then in the relative position shown in Fig. 5.

If the material of the bag is sufficiently thin the weight of the matrix blade 16 under the pressure of the spring plungers 47 may carry the matrix blade 16 to the position shown in Fig. 6 and complete the fold. Where the material of the bag is relatively thick, however, the fold is completed by positively moving the matrix blade to its lowermost position shown in Fig. 6, in the manner now to be explained. When the arms 21 carrying the blade 15 move upwardly the trip members 77 are withdrawn from the pins 56 and the plungers 51 are again moved outwardly under the action of their springs 52. As the matrix blade 16 has fallen, the lugs 34 are now below the heads 54 of the plungers 51 as shown in Fig. 5. The rods 57 being now moved toward the left, as viewed in the drawings, in the manner to be hereinafter described, the L-shaped members 45 are moved around their pivots 26 in an anti-clockwise direction so that a downward thrust is exerted by the heads 54 of the plungers 51 on the lugs 34, forcing the matrix folder blade 16 into its lowermost position, as shown in Fig. 6, to complete the fold. In this latter position the stop screws 41 engage the ledges 43 on the brackets 13 and cause the L-shaped members 32 to move slightly in an anti-clockwise direction on their pivots 31. As shown on the drawings, the upper face of the lugs 34 project to a less distance from their arms 33 than do the lower faces of said lugs, and the ends of the heads 54 may now move into engagement with the lateral faces of the lugs 34. Further downward movement of the arms 46 causes the plungers 51 to be moved slightly inwardly by the camming action of said lugs 34 on the plunger heads 54, until the heads of said plungers pass below the lugs 34, whereupon said plunger heads 54 spring outwardly again beneath said lugs 34, as shown in Fig. 6. The following movement of the rods 57 to the right, as viewed in the drawings causes the members 46 to swing upwardly in a clockwise direction around their pivots 26, lifting and restoring the matrix folder blade 16 to its initial position, as shown in Fig. 1.

To recapitulate the folding operations briefly, the bag is brought into the position shown in dotted lines in Fig. 1 in any suitable way as automatically by a continuous carrier or manually positioned on a suitable support mounted on the front of the machine. The upper edge of the bag is engaged with the lower face of the guide member 27 and the rear face of the bag with its side walls in engagement is placed in contact with the forward face of the stationary folder blade 14 as shown in Fig. 1. The operator then depresses the treadle, which causes the rods 70 to be pulled downwardly. This causes the levers 65 to move in a clockwise direction, the pins 64 moving to the right, as viewed in the drawings, and owing to the engagement of the members 62 with the pins 64, the rods 61 are pulled to the right, as viewed in the drawings, causing the arms 21 to swing around their pivots and carry the folder blade 15 into engagement with the bag material. As the blade 15 moves across the edge of the folder blade 14 at substantially right angles thereto a reverse fold is formed at right angles to the stationary blade 14, as shown in Fig. 4. Just as the downward movement of the folder blade 15 is completed, pins 76 on levers 65 engage the rods 61 and lift the members 62 out of engagement with the pins 64 as shown in Fig. 5, whereupon the spring 75 restores the swinging folder blade 15 to initial position. Also as the swinging folder blade 15 completes its downward movement the trip members 77 engage the pins 56 to withdraw the heads of plungers 51 from under lugs 34 so that the matrix folder blade 16 drops to the position shown in Fig. 5 just as blade 15 is being withdrawn from the reentrant fold. The heads of plungers 51 then spring outwardly above said lugs 34 as shown in Fig. 5 and, the rods 57 being moved to the left as viewed in the drawings, the matrix folder blade is moved downwardly to complete the fold as shown in Fig. 6, following which the plungers 51 are cammed inwardly, and then spring outwardly under the lugs 34, as heretofore explained, whereupon the rods 57 are moved to the right as viewed in the drawings and the matrix folder blade is lifted to initial position, as shown in Fig. 1 where it is ready for operation upon the next bag to be closed.

The rods 57 are moved in the manner heretofore described automatically by power driven mechanism as soon as the matrix folder blade falls to the position shown in Fig. 5. To this end a shaft 80 is rotatably mounted in suitable bearings provided at the rear end of the side members 11, and carries, freely rotatable thereon, a pinion 81 which meshes with a pinion 82 on a stub shaft 83 which carries a belt pulley 84 driven from any suitable source of power, as a line shaft, electric motor, etc. Also mounted on said shaft 80 is a clutch of any suitable construction for driving the shaft 80 from the pinion 81. In the form shown, the hub of pinion 81 is provided with a plurality of pins 85, having flattened faces as shown in Fig. 7, and keyed to said shaft adjacent said pinion is a clutch collar 86 in which is slidably mounted a pin 87 normally pressed outwardly by a spring 88 but which may be drawn inwardly against the tension of said spring by the action of a wedge-shaped fin 89 working between the face of said collar 86 and a lateral projection 90 on said pin 87. When the fin 89 is withdrawn from between the face of the collar 86 and the projection 90, pin 87 is forced outwardly into the path of movement of one of the pins 85, whereby collar 86 and shaft 80 are thereupon rotated from pinion 81. Fin 89 is formed on one arm of a bell-crank lever 91 pivotally mounted on the machine frame at 92 and normally urged in an anti-clockwise direction by spring 93. The outer end of lever 91 is notched at 94 and is engaged by a pin 95 on a bifurcated member 96 which is connected by rod 97 to the treadle mechanism. Bifurcated member 96 is normally held with its pin in notch 94 by a coil spring 98 attached to the frame at one end and to the rod 97 at its other end.

The opposite ends of the shaft 80 are provided with eccentrics 99 and the rods 57 heretofore described project forwardly from the eccentric straps. While eccentrics have been described and illustrated, cams may be employed if preferred so as to prolong the period when the matrix folding blade is in its depressed position for a reason to be explained.

When the operator depresses the treadle as heretofore described rod 97 is pulled downwardly and pin 95 on bifurcated member 96 moves lever 91 in a clockwise direction to withdraw fin 89 from the space between the face of collar 86 and the projection 90 on pin 87, whereupon spring 88 forces pin 87 into the path of movement of one of the pins 85. As the hub of pinion 81 with its pin 85 is rotating continuously, shaft 80 begins to rotate and the eccentrics 99 are rotated to move the rods 57 first forwardly and then rearwardly as heretofore described to press downwardly and then elevate the matrix folder blade 16. Depression of the treadle also releases the lever 91, by withdrawing pin 95 from notch 94, and as soon as released, lever 91 springs forwardly and the fin 89 is in a position to cam out the pin 87, as shown in Fig. 9, upon the completion of one rotation of the shaft 81. When the treadle is released pin 95 is reengaged in notch 94 by spring 98.

In conformity with the present invention means are also provided for fastening the folds of each bag in the position shown in Fig. 6, said means preferably taking the form of stapling mechanism which simultaneously inserts staples into the folds at a plurality of distributed points along the length of the fold. While as respects the broader aspects of the invention said stapling mechanism may be of any suitable construction, or other than stapling mechanism may be employed for fastening the folds of the bag, the preferred embodiment of the present invention includes novel stapling mechanism which is especially designed and adapted to be operated at high speed and arranged in gangs so as to cooperate with the bag folding mechanism heretofore described in the rapid production of bags closed and fastened at a plurality of points along their length of the fold.

Stapling mechanism embodying the features of the present invention may take a variety of forms some of which are shown in my copending application Serial No. 130,643, filed August 21, 1926, and entitled Stapling mechanism, and a preferred form is illustrated in Figs. 11 to 13 inclusive. Said stapling mechanism is not claimed per se in this application, however, as the same constitutes the subject matter of claims in my application Serial No. 130,643 above identified, this application containing claims to the combination of novel stapling mechanism in its cooperative relation with folding mechanism to enable the simultaneous introduction of a plurality of staples at high speed in a machine of the character described.

Mounted on the frame of the machine, as by a cross piece 105 extending between the side pieces 11, is a plurality of stapling mechanisms, shown as bolted to the cross piece 105 through the flanges 106 on the frames of the stapling mechanisms. Any suitable number of stapling mechanisms may be employed, the novel mechanism here disclosed being adapted to be arranged closely in side by side relation so as to permit the use of a relatively large number of said mechanisms across the width of the bag. It is to be understood that the number of stapling mechanisms employed will depend to a considerable extent upon the character of the material being packed, the staples being inserted sufficiently close together so as to prevent sifting of the packed material. In Figs. 2 and 3 two stapling mechanisms are illustrated and a third stapling mechanism 70 would normally be employed, but has been omitted from Fig. 2 for the sake of clearness.

The stapling mechanism is designed to be moved into engagement with the folds of the bag and to insert the staple while the matrix folding blade 16 is holding the folds down around the stationary folding blade 14 as shown in Fig. 6, and the inner plate 24 of the matrix folding blade 16 and the stationary folding blade 14 are accordingly provided with registering apertures 107 and 108 respectively. Three sets of these slots 107, 108 have been illustrated for the use of three stapling mechanisms as described, but when the staples are to be introduced more closely together additional slots positioned in conformity with the location of the stapling mechanism may be provided as illustrated at 107' and 108'.

All of the stapling mechanisms are driven from a common drive shaft 109 which is preferably mounted in bearings carried by blocks 110 and 111. These blocks are preferably adjustable lengthwise of the machine, and are shown as slidable in slots 112 provided in the side members 11. Shaft 109 may be driven in any suitable way. In the form shown shaft 109 carries a sprocket wheel 113 driven by chain 114 from a sprocket wheel 115 mounted on the shaft 80 and arranged to be driven only when the clutch has connected the driving pinion 81 with said shaft as heretofore described. As the stapling mechanism is to operate only during a portion of the cycle of operation of the folding mechanism—during the period when the matrix folding blade 16 is in its lowermost position—means are preferably provided so that said drive shaft 109 for the stapling mechanism is driven during only a portion of the cycle of operation or rotation of the shaft 80, and the sprockets 113 and 115 are properly proportioned so that the sprocket 113 makes one complete revolution while the matrix folding blade 16 is substantially at rest in its lowermost position. The proportion of the cycle of rotation of shaft 80 during which sprocket 115 is in rotation may be varied considerably, the illustrated arrangement causing rotation of sprocket 115 during one-half of the period of rotation of shaft 80—in which event sprocket 113 is one-half the size of sprocket 115.

Any suitable means may be employed for initiating the rotation of sprocket 115 at a suitable period in the rotation of the shaft 80 and for stopping its further rotation at the end of its fractional period of rotation.

In the form shown, see particularly Fig. 10, the hub of sprocket 115 is provided with a pair of spring-pressed pawls 116 disposed 180° apart and shaft 80 carries a radially projecting pin 117 designed to engage one of said pawls as said shaft rotates, and thereby cause the rotation of said sprocket. Mounted on a bracket 118 carried by the frame of the machine is a stationary cam 119 which overlies the end of shaft 80 and is in the path of rotation of the pawls 116 so that after the pawl in engagement with the pin 117 has moved through 180° of revolution, said pawl is cammed out of operative engagement with said pin to discontinue the rotation of said sprocket, whereupon said shaft and pin continue through 180° of further rotation, when the shaft 80 is stopped by the disengagement of the clutch mechanism first described.

As all of the several stapling mechanisms are the same in construction, a description of one will suffice. Referring to Figs. 11 to 14 inclusive, the shaft 109 carries an eccentric 125 and the eccentric strap 126 is connected by a rod 127 to a reciprocating device slidable in the frame 128 of the stapling mechanism. Said reciprocating device is composed of two parts, a lower reciprocating member 129 provided with a nose 130 which is designed to be pressed resiliently against the folds of the bag during the period of introduction of the staples; and a second reciprocating member 131 which is a part of the staple-forming and feeding mechanism hereafter described. The eccentric rod 127 is pivotally connected at 132 to the member 131, and member 131 carries a depending pin 133 which works in a slot 134 in reciprocating member 129. Member 131 also carries a depending post 135 which works in a slot 136 in frame 128 and reciprocating member 129 carries a depending recessed block 137 which works in said slot 136 and carries a plunger 138 normally pressed into engagement with post 135 by a spring 139 between said plunger and the bottom of its recess in said block. Reciprocating members 129 and 131 may therefore move as a unit until the nose 130 engages the folds of a bag, whereupon member 131 may continue to advance to the right, as viewed in Fig. 14, against the tension of spring 139 to feed the staple into the fold, the nose 130 being held against the folds resiliently during the insertion of the staple.

The wire forming the staple, which may be of any suitable shape, size and material, is held on the frame of the machine in any suitable way and is led up to the stapling mechanism over rolls 140 shown in Figs. 1 and 2. From the rolls 140 it passes through an aperture in the post 141 on the frame of the stapling mechanism, through the feeding mechanism particularly shown in Fig. 12, through an aperture in post 142 on the frame of said stapling mechanism, and then through a tubular curved guide 143, which is preferably of resilient material so as to have a certain springiness, whence it is led to the cutting and staple forming mechanism to be described.

Any suitable feeding mechanism may be employed. In the form illustrated in Fig. 12 the upstanding posts 141 and 142 are connected by a pair of rods 144 and 145. Mounted to slide on rods 144 and 145 is a carriage 146 of channel formation, and pivoted in the base of the channel at 147 is a wire clamping jaw 148 normally urged by spring 149 into a position to clamp the wire in a groove 150 in the lower shelf of carriage 146. The clamping jaw 148 has a rearwardly extending arm 151 which is notched at 152, the rear wall of the notch being inclined as shown at 153. Mounted between the clamping member 148, 151 and the upper shelf of the carriage 146 is a bar 154 which may slide with respect to both of said members and which has a depending lug 155 designed to enter the slot 152. The rear end of this lug 155 is inclined in conformity with the inclination of the rear wall of the slot 153.

Carriage 146 is reciprocated on its rods 144 and 145 by a cam yoke 156 pivoted at 157 to a depending lug on the frame and pinned to the carriage 146 by a pin and slot connection 158. The cam yoke 156 is actuated by a cam on the shaft 109, shown in dotted lines in Fig. 11.

As the carriage 146 is moved to the left from the position shown in Fig. 12, the wire is clamped between the jaw 148 and the lower shelf of the carriage 146, and the wire is carried therewith toward the left as viewed in Fig. 12 until the projecting end of the bar 154 engages the post 142 or an adjustable projection thereon, whereupon said bar 154 is held stationary while carriage 146 continues its movement toward the left and the arm 151 of clamping jaw 148 is cammed downwardly by the coaction of the surfaces 153, thereby releasing the wire from clamping jaw 148. The carriage then moves freely over the wire to the end of the stroke, the lug 155 riding on the upper surface of the arm 151 to hold the jaw open. As the carriage moves to the right as viewed in Fig. 12, the bar 154 is carried frictionally therewith, with its lug 155 still holding the clamping jaw open, until the bar 154 engages the post 141, when its further rearward motion stops, while the carriage continues to move rearwardly, permitting the lug 155 to drop into the slot 152. In order to prevent the clamping jaw from closing until the carriage has actually started on its forward stroke the rear end of arm 151 is notched at 160 and post 141 carries a projection 161 which engages in the notch 160 and holds the clamping jaw open until the jaw is carried by the carriage far enough to free the notch 160 from the pin 161. As lug 155 is now in slot 152 the spring 149 closes the jaw and the next forward feeding movement of the wire takes place.

In order to positively prevent the wire being accidentally displaced during the non-feeding movement of the carriage 146 a spring-pressed clamping member 162 pivoted at 163 in a slot in the post 142 is preferably provided for resiliently clamping the wire in the position in which it is left at the end of the forward feed. This clamping member does not interfere with the positive feeding of the wire above described.

Mounted on the frame of the stapling mechanism over the reciprocating members 129 and 131 is a cover 165 from which a lug 166 extends upwardly at an angle of approximately 45° to the horizontal, and a stationary cutter plate 167 is pivoted on lug 166 at 168. Said plate 167 lies in a plane at approximately 45° to the horizontal, and reciprocatably mounted in a slot in said plate 167 is a movable cutter bar 169 which carries a tubular bracket 170 in which the tubular guide 143 is suitably secured. Bar 169 is reciprocated by a lever 171 pivotally mounted on the lug 166 and having an upwardly projecting end 172 which engages in a slot 173 in said bar 169. Lever 171 is engaged and operated during the stroke of the members 129 and 131 by a projection 174 on the member 131, which causes the lever 171 to rotate in an anti-clockwise direction as viewed in Fig. 14, pulling the cutter bar 169 to the left as viewed in that figure or to the right as viewed in Figs. 12 and 13. The wire which enters the tubular bracket 170 passes through an aperture 175 in bar 169 and is cut off by the movement of said bar and wire relatively to the stationary edge of a knife 167' secured to stationary cutter bar 167 (Figs. 11 and 14). Cutter bar 169 is moved in the opposite direction by the resiliency of the guide tube 143, or it may be moved positively by the engagement of a post 174' on the member 131 with the lever 171.

In order to adjust the length of wire cut, plate 167 is pivoted as heretofore described and carries an upstanding lug 176 which is connected by a rod 177, which may rotate in but not move lengthwise relatively to said lug 176, through a universal joint 178 to an adjustable screw 179 threaded into post 142. The opposite end of screw 179 projects into the path of the sliding bar 154 heretofore described. By rotating the screw 179 the extent of projection of its end may be varied and therefore the forward feed of the wire be increased or decreased by a lengthening or shortening of the stroke of said bar 154. This movement of adjustment of the stop screw 179 simultaneously pivots the cutter mechanism about its pivot 168 so as to advance or withdraw said cutting mechanism by one-half the extent to which the feed of the wire is adjusted—thereby assuring that the severed section of wire shall be centered with respect to the staple forming mechanism next to be described, whether said length of wire is increased or decreased.

The wire as it is fed past the cutter is received in a slot 177 formed between the end 178 of the cover and a plate 179 suitably secured thereto as by screws. This slot is of a width to receive the wire without binding and when the staple is made from flattened wire, said slot is of a width to receive the wire flatwise and prevent its turning in said slot.

The wire as it enters the slot is at an angle of approximately 45° to the horizontal and, when it is severed, the severed section is laid down into a horizontal plane, the slot 177 being suitably shaped to permit this movement of the severed section of wire. To lay the wire in its horizontal position an arm 180, provided with an inwardly projecting end 181 which overlies the slot 177, is carried by a rotatable rod 182 mounted in bearings 183 and 184 in the cover. Rod 182 is normally urged in a direction to throw the arm 180 into a horizontal position by a coil spring 185 connected to a pin on said rod and a pin on the cover. Rod 182 also carries a pair of pins 186 and 187. Pin 186 cooperates with a lateral projection 188 on the lever 171, said projection engaging said pin 186 in one position to hold rod 182 so that the arm 180 is disposed above the wire that has been projected through aperture 175 but releasing said pin 186 when said lever 171 is actuated to operate the cutting mechanism. When projection 188 leaves the pin 186, so that the spring 185 tends to rotate said rod to force the arm 180 downwardly, the projection 181 on arm 180 is resting against the wire and as soon as the wire is severed by said cutting mechanism, said arm 180 is moved to its horizontal position by the spring 185 rotating rod 182, forcing the severed section of said wire ahead of it into a horizontal position.

Pin 187 cooperates with an inclined surface 189 on the reciprocating member 131 to rotate the rod 182 in the opposite direction during the return stroke of the member 131, so as to restore pin 186 into cooperation with the projection 188 on lever 171 and raise arm 180 above the path of the entering wire before the latter is fed forwardly for a new length to be severed.

The severed piece of wire when laid horizontally is disposed across the end of an inverted channel-shaped matrix die member 191 suitably secured to the underside of the cover. The lateral walls of said die member are each provided with a downwardly and rearwardly inclined surface 192 which leads to a horizontal slot 193. The width of the channel between the bottoms of the slots 193 is slightly greater than the width of the channel at the inclined surfaces 192. The male die member is shown as a block 194 pivoted at 195 in member 131 and adapted to be cammed upwardly by a ball 196 carried in member 129 and cooperating with a cam surface 197 provided in the bottom of the way for said reciprocating members 129 and 131. As the members 129 and 131 are reciprocated rearwardly from their forward position, at which time the wire section has been laid in horizontal position across the opening in matrix die 191, die member 194, owing to the cooperation of ball 196 with cam surface 197, is inclined upwardly so as to engage the wire as it lays across said opening of said die member 191, and as said die member 194 continues its movement rearwardly, the wire section is drawn into the matrix die 191 to form the staple and at the same time it is positively moved downwardly by the action of the inclined surfaces 192, and then positively moved horizontally into the grooves 193, the lateral arms of the staple springing out into said grooves 193 to prevent the staple rising along the surfaces 192 during the feeding movement of the formed staple.

The upper surface of member 131 is provided with a pair of upstanding lugs 199, and as the member 131 reciprocates to the right as viewed in Fig. 14 the staple is fed forwardly with its two arms projecting forwardly in the grooves 193. Suitable means may be provided for preventing the rise of the die member 194 during this direction of movement of the member 131, but there is no objection to it again rising, as it may rise freely within the space embraced by the arms of the staple without interfering with the staple as the latter is positively fed forward by the lugs 199 in the grooves 193.

In order that the machine shall work at high speed the stroke of the parts heretofore described should be relatively short and means are therefore provided whereby the formed staples are advanced to the position where they are to be inserted into the folds of the bag by a step-by-step motion. The reciprocating member 131 is provided with a plurality of successive pairs of lugs 200 disposed at distances along its length equivalent to the stroke of said member, and the under side of the cover plate 201 at the forward end of the frame has suitably secured thereto a corresponding number of downwardly inclined U-shaped springs 202 which are designed to bear upon the staples as they are fed forwardly in the grooves 193 by successive pairs of lugs 200. Each U-shaped spring 202 also has an intermediate arm 203 which projects below the plane of the arms 202 so as to form a positive stop for engaging the rear of the staples and preventing their retraction during the rearward movement of the member 131. The grooves 193 are provided with enlargements 204 adjacent the arms 203 so as to permit the body of each staple to rise over the lugs 200, being cammed up by the inclined rear faces of said lugs, as a pair of lugs passes under the staple to assume a feeding relation thereto, at which time the staple is retained in the position to which it has been fed by the action of the arm 203. Therefore the staples are fed forward successively in a step by step motion, and are continuously controlled by the springs 202 which hold them in the grooves 193 and prevent their dislocation from said grooves.

The last resilient member 202, 203 is designed to depress the staple downwardly into the path of the reciprocating member 131 when the latter is in its extreme rearward position as viewed in Fig. 14, and the nose 130 is provided with an additional spring 205 having a free end which bears on the cover plate 201 and an intermediate bent section which aids in depressing the foremost staple in the series downwardly into the path of the reciprocating member 131. As said member moves to the right as viewed in Fig. 14 it forces the staple ahead of it through the slot 206 in the nose 130 and drives it into the folds of the bag, the ends of the staple being deflected inwardly by the outer member 23 of the matrix folder blade 16, clamping the arms inwardly into tight engagement with the folds of the bag closure.

To recapitulate briefly the operation of the stapling mechanism, the rotation of the shaft 109 causes the eccentric to feed the reciprocating members 131 and 129 forwardly, said members moving as a unit during their initial advance. Simultaneously the carriage 146 is advanced by the yoke 156, and as the clamping jaw 148 is in clamping position as soon as the notch 160 is free from the pin 161, since the lug 155 is in the notch 152, the wire is positively fed forward through the tubular guide 143 and the aperture 175 in the reciprocating cutter blade 169 into the slot 177, the extent of feed being determined by the adjustment of screw 179. At this stage of the operation the arm 180 is held in its upper position by the coaction of pin 186 on rod 182 with the lateral projection 188 on the lever 171. As the feeding mechanism advances, bar 154 engages the end of stop screw 179 and moves lug 155 out of notch 152 to open the clamp 168, and further forward feed of the wire ceases. The carriage 146 continues to advance, sliding freely over the wire, and at the same time the reciprocating member 131 has advanced projection 174 into engagement with the end of lever 171 and reciprocating member 129 has been pressed resiliently against the fold of the bag by the coaction of the depending post 135 on member 131 with the spring-pressed plunger 138 on member 129. Projection 174 operates lever 171 to move the slidable cutter bar 169 to the right as viewed in Fig. 12, and simultaneously projection 188 on said lever leaves pin 186, so that the end 181 of arm 180 bears against the projected wire under the tension of the spring 185. Further movement of the cutter bar 169 causes the wire to be severed where the wire is pressed against the knife 167' of the cutter plate 167, whereupon the spring 185 causes the rod 182 to rotate and arm 180 to move the severed length of wire into a horizontal position in front of the matrix die 191.

Reciprocating member 131 now commences its rearward travel, or to the left as viewed in Fig. 14, and male die 194 is cammed upwardly, by the coaction of ball 196 with cam 197, to engage the section of wire and move it into the matrix die 191 to form the staple. The male die 194 positively moves the staple down the inclines 192 and into the horizontal slots 193, where the arms spring outwardly, after which the male die drops to its horizontal position. During this movement of the member 131 to the left as viewed in Fig. 14 the movable cutter bar 169 has returned to initial position under the tension of the resiliency of the tubular guide 143 or by the engagement of pin 174' with lever 171, the incline 189 has engaged pin 187 to rotate rod 182 and restore arm 180 to its elevated position, and the cam yoke 156 has moved the carriage 146 back to its initial position ready to clamp and feed forward the wire.

The next time the machine is operated the same cycle of operation is repeated and the staple which has been formed during the previous cycle is fed forwardly in the grooves 193 by the lugs 199 past the first depending arm 203, where it is retained during the return movement of the member 131. During successive cycles of operation successive staples are formed and fed forwardly until the forward staple is forced downwardly ahead of and into the path of reciprocating member 131 and on the next forward movement of that member to the right, as viewed in Fig. 14, a staple is forced into the fold of the bag. Thereafter at every operation of the stapling mechanism a staple is forced into the fold of a bag, while other staples are being formed and fed forwardly in the manner described.

It is to be noted that the stapling mechanism is driven from a shaft at right angles to the length of the stapling device and all of the operating mechanism, including the eccentric, the cam and the wire feeding mechanism, is in longitudinal alignment with and embraced in a width of space no greater than the staple-forming and feeding devices which in turn are but little wider than the formed staples. Therefore the stapling mechanisms may be arranged very closely together, substantially in side-by-side contact if desired, and a gang of staplers may therefore be employed to insert staples in closely adjacent side-by-side relationship, when desired. It is also to be noted that the wire is fed into the stapling device at an angle to the horizontal where it is severed and then positively laid in a horizontal position. The staple is then made on the back stroke of a male die member with its legs projecting forwardly, the staple being formed in one plane, and then moved positively into a closely adjacent parallel plane, in which it is fed forwardly, in a step-by-step motion, which requires only a short stroke and enables the staples to be made and fed forward at high speed. This construction not only simplifies the construction and renders the device very compact, but it enables the staples to be formed and inserted at a relatively high rate of operation.

From the foregoing description of the sequence of operations employed in making the folds and completing the closure, as utilized in the machine by which it is preferred to carry out the closing of bags, the novel method of effecting the closure of bags will now be clear. The bag with its sides in contacting relation is brought against the side of a stationary folding blade. A reentrant fold is then made at substantially right angles to said stationary blade, so as to form the material into a T-shape with two layers on one side and one layer on the other side of the stem of the T as represented by the material in contact with the stationary blade. The two arms of the T are then folded down on either side of the stationary blade into reenforcing relationship with the material of the bag proper, leaving two reenforcing layers on one side and one on the other of said bag. While in this position the four layers are secured together, preferably simultaneously at a plurality of points distributed along the length of the fold, the proximity of said points depending upon the character of material to be packed and its tendency to sift. In the preferred embodiment the securing of the folds is accomplished by staples which firmly grip the folds. The material of the bag proper is thus reenforced on both sides of the closure and a strong, tight closure is effected which is not likely to break open, even though the bag is subjected to relatively rough handling.

As heretofore pointed out, the above method is preferably carried out by machine operations to enable high speed closure of the bag and the machine heretofore described is especially adapted to carry out said process at high speed. Briefly summarizing, the operation of the machine is as follows: A bag having been placed with the end to be closed against the stationary blade 14 with its upper edge in contact with the guide member 27, the operator steps on the treadle, which lowers the folder blade 15 to form the first or reentrant fold at right angles to the stationary folding blade. At the end of the downward movement of said blade the member 62 is disconnected from pin 64, permitting the blade 15 to swing upwardly to initial position. As the blade 15 completes its folding stroke, the trip 77 releases the matrix blade 16 to drop onto the reentrant fold, just as the swinging blade 15 is being withdrawn, to hold the material in its folded position. At the same time, the clutch fin 89 is withdrawn to permit pin 86 to lock the pinion 81 to the shaft 80, whereupon the shaft 80 begins to rotate and through the eccentrics 99 to move the rods 57, to the left as viewed in Fig. 2, causing the matrix folder blade 16 to be pressed downwardly to its lowermost position by reason of the engagement of the heads of plungers 51 with the lugs 34. The rotation of shaft 80 also causes pin 117 to engage one of the pawls 116 and start the shaft 109 in rotation through the sprockets and chain described, and as the matrix folder blade reaches its lowermost position, the nose 130 of each of the stapling devices is pressed forwardly against the fold through the registering notches 107 and 108 and the reciprocating members 131 drive staples into the fold opposite each of the stapling devices. Thereafter the stapling mechanism is withdrawn, and at the end of 180° of rotation of the shaft 80 the stapling mechanism has completed its cycle and is stationary for the rest of the cycle of rotation of the shaft 80. As shaft 80 continues its rotation, the rods 57 are moved to the right as viewed in Fig. 2 by the eccentrics, and the heads of the plungers 51 which have moved under the lugs 34 return the matrix folder blade 16 to starting position. As shaft 80 completes its rotation the pin 87 is cammed out of its clutching relation to the pins 85 by the wedge-shaped fin 89, and shaft 80 comes to rest. The machine is now ready for a fresh actuation by the operator stepping on the treadle.

It will therefore be perceived that this machine may be operated at a very high speed, and experience has demonstrated that filled bags may be closed as rapidly as 250 per minute or more, while bags may be folded and the closure completed in a flat condition as rapidly as 400 per minute. At the same time the machine is relatively simple and compact so that it may be readily transported, and it is also strong and rugged and readily operable by unskilled labor.

It will therefore be perceived that a method of closing bags has been provided whereby a strong, tight closure may be effected rapidly, whereby the closure is of a character to prevent sifting of the contained material, and whereby the closure is so effected as to reenforce the walls of the bags, minimizing the likelihood of rupture at the closure. At the same time the method is one that is susceptible of being carried out at a high speed by a machine of simple and rugged construction.

It will also be perceived that a high speed machine has been provided for effecting a strong, tight, reenforced closure of bags that will prevent sifting, because the folds of the closure may be secured at the desired number of points, the closure being effected at high speed because of the simultaneous action of high speed stapling mechanism.

While one embodiment of the invention has been described and illustrated with considerable particularity, it is to be expressly understood that the invention is not restricted thereto, as the same is capable of being variously embodied as will now be apparent to those skilled in the art. Changes may also be made in the details of construction, arrangement and proportion of parts, and certain features used without other features, without departing from the spirit of the invention. While it is preferred to complete the closure by gang stapling mechanism, as heretofore described, it is to be expressly understood that the folding method and machine may be used for effecting the desired folds and any other suitable mechanism may be employed therewith for completing and securing the closure. While reference has been made to the use of the method and machine in completing the closure of filled bags, it is also to be expressly understood that the invention is not restricted thereto, as the invention is applicable to the making of closures in unfilled bags, in which event the folding mechanism may be in effect swung through 90° so that the stationary folder blade may be horizontal instead of vertical. Moreover, while reference has been made throughout the specification to the closure of bags, it is to be expressly understood that this term is used as generic to any suitable flexible container and is therefore to be construed as embracing flexible containers of any suitable character, whether technically known as bags or not, wherever this term occurs in the specification and claims.

What is claimed is:—

1. The method of closing bags which includes forming a reentrant fold with the sections thereof extending at an angle to the body of the bag, folding the sections of said reentrant fold into engagement with both sides of said body, and simultaneously securing the folds together at a plurality of separated points.

2. The method of closing bags which includes folding the lips of the bag into substantially a T-shape, folding the arms of the T into engagement with the body of the bag at both sides thereof, and simultaneously securing said folds together at a series of separated points.

3. The method of closing bags which includes forming a reentrant fold in the bag at substantially a right angle to the body to give the material a substantially T formation, folding the arms of the T into reenforcing relationship with the body of the bag, and simultaneously securing the folds together at a plurality of separated points.

4. The method of closing bags which includes forming a reentrant fold at substantially a right angle to the body of the bag to give the material a substantially T formation, folding the arms of the T into reenforcing relation with both sides of said body, and simultaneously inserting a series of staples through all of the folds.

5. The method of closing bags which includes forming a reentrant fold in the lips of the bag at an angle to the edge of a relatively stationary blade, folding the sections of said reentrant fold about said blade into engagement with the sides of the body portion of the bag, and simultaneously securing the folds together at a plurality of separated points while the folds are engaged with said blade.

6. The method of closing bags which includes forming a reentrant fold in the lips of the bag at substantially a right angle to the edge of a relatively stationary blade to give the material a substantially T formation, folding the arms of the T about said blade into engagement with the sides of the body, and securing the folds together.

7. The method of closing bags which includes folding the lips of the bag into a substantially T shape across the edge of a relatively stationary blade, folding the arms of the T about said blade into reenforcing relation with both sides of the body and simultaneously securing said folds together at a series of spaced points.

8. The method of closing bags which includes forming a reentrant fold at substantially a right angle to the body of the bag across the edge of a relatively stationary blade to give the material a substantially T formation, folding the arms of the T against the sides of the body, and simultaneously stapling the folds together at a series of separated points.

9. The method of closing bags which includes folding the material of the bag into substantially a T formation across the edge of a relatively stationary blade, folding the arms of the T into reenforcing relation with both sides of the body, and inserting staples at a plurality of points through all of the folds while the folds are engaged with said blade.

10. The method of closing bags which includes folding the material of the bag into a substantially T formation across the edge of a relatively stationary blade, folding of the arms of the T into reenforcing relation with both sides of the body, and simultaneously inserting a plurality of staples through said folds at a plurality of separated points.

11. In a machine for folding bags, a stationary folder blade, means for forming a reentrant fold at an angle to the edge of said blade, means for folding the sections of said fold into reenforcing relation with both sides of the body of the bag, and means for simultaneously securing the folds together at a series of spaced points.

12. In a machine for folding bags, a stationary folder blade, a movable folder blade for forming a reentrant fold at substantially a right angle to said stationary blade, and folding mechanism for folding the sections of said fold into reenforcing relation with both sides of the body of the bag.

13. In a machine for folding bags, a stationary folder blade, a movable folder blade for making a reentrant fold at an angle to the edge of said stationary blade, mechanism for retaining said material in folded relation and thereafter folding the sections of said first-named fold into reenforcing relation with both sides of the body of the bag, and means for simultaneously securing the folds together at a plurality of spaced points while said folds are engaged with said stationary blade.

14. In a machine for folding bags, a stationary folder blade, a movable folder blade for forming a reentrant fold across the edge of said stationary blade, and folding mechanism actuated by the movement of said movable blade for folding the sections of said first-named fold into reenforcing relation with both sides of the body of the bag.

15. In a machine for folding bags, a stationary folder blade, a movable folder blade for forming a reentrant fold across the edge of said stationary blade, mechanism for folding the sections of said first-named fold about said stationary blade into reenforcing relation with the sides of the body of the bag, and means operated by the movement of said movable blade for initiating the movement of said folding mechanism.

16. In a machine for folding bags, a stationary folder blade, a movable folder blade for forming a reentrant fold across the edge of said stationary blade, mechanism for folding the sections of said first-named fold into reenforcing relation with the sides of the body of the bag, power-driven mechanism for operating said last-named mechanism, and means operated by said movable blade for initiating the operation of said folding mechanism.

17. In a machine for folding bags, a stationary folder blade, a movable folder blade for forming a reentrant fold across the edge of said stationary blade, mechanism for folding the sections of said first-named fold against the sides of the body of the bag, means normally holding said last-named mechanism in inoperative position, and means for releasing said mechanism at the end of the folding operation of said movable blade.

18. In a machine for folding bags, a stationary folder blade, a movable folder blade for forming a reentrant fold across the edge of said stationary blade, mechanism for folding the sections of said first-named fold against the sides of the body of the bag, means normally holding said last-named mechanism in inoperative position, and means for tripping said mechanism at the end of the folding operation of said movable blade to grip and retain the fold made by said movable blade.

19. In a machine for folding bags, a stationary folder blade, a movable folder blade for forming a reentrant fold across the edge of said stationary blade, mechanism for folding the sections of said first-named fold against the sides of the body of the bag, means normally holding said last-named mechanism in inoperative position, means for tripping said mechanism at the end of the folding operation of said movable blade to grip and retain the fold made by said movable blade, and means for thereafter moving said folding mechanism to complete the fold.

20. In a machine for folding bags, a stationary folder blade, a movable folder blade for forming a reentrant fold across the edge of said stationary blade, mechanism for folding the sections of said first-named fold against the sides of the body of the bag, means operated by the movement of said movable blade for effecting the movement of said folding mechanism to grip and retain the fold made by said movable blade, and power-driven mechanism for moving said folding mechanism.

21. In a machine for folding bags, a stationary folder blade, a movable folder blade for forming a reentrant fold across the edge of said stationary folder blade, mechanism for folding the sections of said first-named fold against the sides of the body of the bag, means operated by the movement of said movable blade for effecting the movement of said folding mechanism to grip and retain the fold made by said movable blade, means for moving said movable blade into folding position, and means actuated by said last-named means for thereafter moving said folding mechanism to complete the fold.

22. In a machine for folding bags, a plurality of movable folding mechanisms, means for moving one of said mechanisms to effect a fold, and means operated by the movement of said last-named folding mechanism for releasing said mechanism from its moving means to permit its independent return ahead of the operation of the other folding mechanism.

23. In a machine for folding bags, a plurality of movable folding mechanisms, means normally holding one of said mechanisms in inoperative position, means for moving another of said folding mechanisms to folding position, and means operated by said last-named folding mechanism for releasing said first-named mechanism.

24. In a machine for folding bags, a plurality of movable folding mechanisms, means normally holding one of said mechanisms in inoperative position, means for moving another of said folding mechanisms to folding position, means operated by said second-named folding mechanism for releasing said first-named mechanism, and means operated by the movement of said second-named folding mechanism for releasing the same from its moving means.

25. In a machine for folding bags, a plurality of movable folding mechanisms, means normally holding one of said mechanisms in inoperative position, means for moving another of said folding mechanisms to folding position, means operated by said last-named folding mechanism for releasing said first-named folding mechanism and means for moving said first-named folding mechanism to complete the fold.

26. In a machine for folding bags, a plurality of movable folding mechanisms, means normally holding one of said mechanisms in inoperative position, means for moving another of said folding mechanisms to folding position, means operated by said last-named folding mechanism for releasing said first-named mechanism, and power-driven means for operating said first-named folding mechanism actuated by the movement of said second-named means.

27. In a machine for folding bags, a plurality of movable folding mechanisms, means normally holding one of said mechanisms in inoperative position, means for moving another of said folding mechanisms to folding position, means operated by said last-named folding mechanism for releasing said first-named mechanism from its holding means and said second-named folding mechanism from its moving means, and power-driven means for moving said first-named folding mechanism actuated by the movement of the said second-named means.

28. In a machine for folding bags, a stationary folder blade, a movable folder blade, means under the control of the operator for moving said movable folder blade into cooperative relation with said stationary blade, a second movable folder blade, and power-driven means for predeterminately moving said second movable folder blade into cooperative relation with said stationary blade.

29. In a machine for folding bags, a movable folder blade, means under the control of the operator for moving said movable folder blade, a second movable folder blade, power-driven means for moving said second movable blade, and means automatically actuated by the movement of said first named means for initiating the operation of said power-driven blade.

30. In a machine for folding bags, a movable folder blade, means under the control of the operator for moving said movable folder blade, a second movable folder blade, means normally retaining said second blade in inoperative position, and means automatically actuated by the movement of the first movable blade for releasing said second movable blade.

31. In a machine for folding bags, a movable folder blade, means under the control of the operator for moving said movable folder blade, a second movable folder blade normally held in inoperative position, means operated by the movement of said first movable blade for releasing said second movable blade, means operated by said first-named means for disconnecting said first movable blade from its moving means, and means for returning said first movable blade to its initial position.

32. In a machine for folding bags, a movable folder blade, means under the control of the operator for moving said movable folder blade, a second movable folder blade normally held in inoperative position, power-driven means for moving said second movable blade, means automatically operated by the movement of said first movable blade for releasing said second movable blade and means for initiating the power operation of said second movable blade.

33. In a machine for folding bags, a movable folder blade, means under the control of the operator for moving said movable folder blade, a second movable folder blade normally held in inoperative position, power driven means for moving said second movable blade, means operated by the movement of said first movable blade, for releasing said second movable blade, means for initiating its power operation, means operated by the movement of said first named means for disconnecting said first movable blade from its moving mechanism, and means for withdrawing said first movable blade from the path of said power driven blade.

34. In a machine for folding bags, a stationary folder blade, a movable folder blade pivoted to swing across the edge of said stationary folder blade, means under the control of the operator for moving said movable blade, and a second movable blade for folding the material on both sides of said stationary blade.

35. In a machine for folding bags, a stationary folder blade, a movable folder blade pivoted to swing across the edge of said stationary folder blade, means under the control of the operator for moving said movable blade, a second movable blade for folding the material on both sides of said stationary blade, and power-driven means for moving said second movable blade set in operation by the movement of said first named means.

36. In a machine for folding bags, a stationary folder blade, a movable folder blade pivoted to swing across the edge of said stationary folder blade, means under the control of the operator for moving said movable blade, a second movable blade for folding the material on both sides of said stationary blade, means normally holding said second movable blade in inoperative position, and means actuated by the movement of said first-named movable blade for releasing said second blade to grip the fold made by said first movable blade.

37. In a machine for folding bags, a stationary folder blade, a movable folder blade pivoted to swing across the edge of said stationary folder blade, means under the control of the operator for moving said movable blade, a second movable blade for folding the material on both sides of said stationary blade, means normally holding said second movable blade in inoperative position, means actuated by the movement of said first-named movable blade for releasing said second movable blade to grip the fold made by said first movable blade, and means actuated by the movement of said first named means for moving said second movable blade to complete the fold.

38. In a machine for folding bags, a stationary folder blade, a movable folder blade pivoted to swing across the edge of said stationary folder blade, means under the control of the operator for moving said movable blade, a second movable blade for folding the material on both sides of said stationary blade, power-driven means for moving said second movable blade, and means actuated by the movement of said first-named means for initiating the operation of said power-driven means.

39. In a machine for folding bags, a stationary folder blade, a movable folder blade pivoted to swing across the edge of said stationary folder blade, means under the control of the operator for moving said movable folder blade, a second movable blade for folding the material on both sides of said stationary blade, power-driven means for moving said second movable blade, means actuated by the movement of said first named means for initiating the operation of said power-driven mechanism and for releasing said first movable blade from its moving means, and means for retracting said first movable blade from the path of said second movable blade.

40. In a machine for folding bags, a stationary folder blade, a movable folder blade pivoted to swing across the edge of said stationary folder blade, means under the control of the operator for moving said movable blade, a second movable blade for folding the material on both sides of said stationary folder blade, means normally holding said second movable blade in inoperative position, power-driven means for operating said second movable blade, means actuated by the movement of said first movable blade for releasing said second movable blade to grip the fold made by said first movable blade, means for initiating the operation of said power-driven mechanism, means for releasing said first movable blade from its moving means, and means for retracting said first movable blade from the path of said power-driven blade.

41. In a machine for folding bags, a stationary folder blade, a pivoted folder blade for effecting a reentrant fold at an angle to said stationary blade, and a second movable blade for folding the material of said first-named fold on both sides of said stationary blade.

42. In a machine for folding bags, a stationary folder blade, a movable folder blade for effecting a reentrant fold at substantially a right angle to said stationary blade, a second movable blade for folding the material of said first-named fold on both sides of said stationary blade, and means under the control of the operator for effecting the automatic actuation of said folder blades in sequence to complete the fold.

43. In a machine for folding bags, a movable folder blade, means under the control of the operator for moving said movable folder blade, a second movable folder blade, power driven means for moving said second movable blade into and out of folding position, and means automatically operated by the movement of said first named means for initiating the operation of said second movable blade.

44. In a machine for folding bags, a movable folder blade, means under the control of the operator for moving said movable folder blade, a second movable folder blade normally held in inoperative position, power-driven means for moving said second movable blade, and means automatically operated by the movement of said first named means for releasing said second movable blade and initiating its power operation, said power-driven means cooperating with said second movable blade to return the same to inoperative position.

45. In a machine for closing bags, folding mechanism for folding the material of the bag into substantially parallel folds, and means for simultaneously attaching said substantially parallel folds together at a series of separated points.

46. In a machine for closing bags, folding mechanism for folding the material of the bag, means for simultaneously attaching the folds at a plurality of separated points, and power-driven means for operating said attaching mechanism set in operation by the movement of said folding mechanism.

47. In a machine for closing bags, folding mechanism for folding the material of the bag into substantially parallel folds, and stapling mechanism for simultaneously inserting a plurality of staples through said folds at separated points.

48. In a machine for closing bags, folding mechanism for folding the material of the bag, stapling mechanism for simultaneously inserting a plurality of staples in the folds at separated points, and power-driven means for operating said stapling mechanism set in operation by the movement of said folding mechanism.

49. In a machine for closing bags, means for folding the material of the bag into substantially parallel folds to form a closure, and a gang of stapling devices arranged lengthwise of the fold for simultaneously inserting a series of staples into the fold at a plurality of separated points.

50. In a machine for closing bags, means for folding the material of the bag to form a closure, a gang of stapling devices arranged lengthwise of the fold for simultaneously inserting a plurality of staples into the fold at a plurality of separated points, power-driven means for simultaneously operating said stapling devices, and means actuated by the operation of said folding mechanism for initiating the operation of said stapling devices.

51. In a machine for closing bags, folding mechanism for folding the material of the bag into substantially parallel folds to form a closure, a plurality of stapling mechanisms arranged along the length of the fold, said stapling mechanism each including wire feeding, staple forming and staple feeding devices, a drive shaft for said stapling mechanisms at right angles thereto, and means on said shaft within the width of said staple forming and feeding devices for driving said stapling mechanisms whereby said stapling mechanisms may be arranged in closely adjacent lateral relationship.

52. In a machine for closing bags, folding mechanism for folding the material of the bag to form a closure, a plurality of stapling mechanisms arranged along the length of the fold, said stapling mechanisms each including devices for forming a staple on a short back stroke and for feeding it forwardly in a different plane on a short forward stroke whereby said staples may be formed and fed to the fold during a brief period when the folding mechanism is reversing its direction of stroke, and means for operating said stapling mechanisms simultaneously.

53. In a machine for closing bags, folding mechanism for folding the material of the bag to form a closure, a plurality of stapling mechanisms arranged along the length of the fold, said stapling mechanisms each including means for moving the stapling mechanism into engagement with the fold, means for forming and inserting a staple into the fold, and means for simultaneously operating said stapling mechanisms.

54. In a machine for closing bags, folding mechanism for folding the material of the bag to form a closure, a plurality of stapling mechanisms arranged along the length of the fold, said stapling mechanisms each including means for pressing the stapling mechanism resiliently against the fold means for forming and inserting a staple into the fold, and a common drive shaft for all of said stapling mechanisms.

55. In a machine for closing bags, mechanism for folding the material of the bag into substantially parallel folds on both sides of a stationary blade, and means for thereafter simultaneously connecting the folds at a plurality of separated points while said folds are formed about said stationary blade.

56. In a machine for closing bags, mechanism for folding the material of the bag into substantially parallel folds on both sides of a stationary blade, and mechanism for thereafter simultaneously inserting a plurality of staples into the folds at separated points along the length of the fold while said fold is engaged with said stationary blade.

57. In a machine for folding bags, mechanism for folding the material of the bag over a stationary blade, said blade being provided with slots to permit the insertion of staples into the fold transversely of said blade, a series of stapling mechanisms, and means for moving said mechanisms into said slots and inserting a series of staples simultaneously into the fold.

58. In a machine for folding bags, mechanism for folding the material of the bag over a stationary blade, said folding mechanism being provided with slots to permit the insertion of staples into the fold, a series of stapling mechanisms in alinement with said slots, and means to move said stapling mechanisms into said slots to press resiliently against the fold while a series of staples are simultaneously inserted into the fold.

59. In a machine for closing bags, mechanism for folding the material of the bag on both sides of a stationary folder blade, a plurality of stapling mechanisms arranged along the length of the fold for simultaneously inserting into the fold a plurality of staples at separated points, means for simultaneously operating said stapling mechanisms, and means operated by the movement of said folding mechanism for initiating the operation of said stapling mechanisms.

60. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously while the folding mechanism is reversing its direction of movement.

61. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously including a common drive shaft at right angles to the length of said mechanisms and means on each of said mechanisms within the width of the staple forming devices for operating said stapling mechanisms from said common shaft.

62. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, said mechanisms each including devices for forming a staple on a short back stroke and feeding the staple forwardly with its legs advanced on a short forward stroke whereby said staple may be formed and inserted during the reversal of motion of said folding mechanism.

63. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies, dies for forming the staple on a short back stroke with its legs advanced, and means for feeding the staple forwardly in a different plane.

64. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies at an angle to the horizontal, means for severing the wire, dies for forming the staple on a short back stroke with its legs advanced, and means for feeding the formed staple forwardly in a different plane.

65. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies at an angle to the horizontal, means for severing a length of the wire and moving it to a horizontal plane, dies for forming the staple in a horizontal plane with its legs advanced, and means for feeding the staple forwardly.

66. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies, dies for forming the staple on the back stroke with its legs advanced, and means for feeding the staples forwardly in a step by step motion.

67. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies, dies for forming the staple on the back stroke with its legs advanced, means for feeding the staple forwardly in a different plane, and means for advancing successive staples in a step by step motion.

68. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies, dies for forming the staple, and means for simultaneously feeding a plurality of successive staples forwardly in a step by step motion to the staple-inserting position.

69. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire at an angle to the staple forming dies, dies for forming the staple with its legs advanced, and short stroke feeding mechanism for advancing the formed staples in a step by step motion.

70. In a machine for closing bags, mechanism for folding the material of the bag on both sides of a stationary folder blade, a plurality of stapling mechanisms arranged along the length of the fold for simultaneously inserting into the fold a plurality of staples at separated points, and means for operating said stapling mechanisms simultaneously, each of said stapling mechanisms including devices for feeding wire to the staple forming dies, dies for forming the staple on a short back stroke in one plane, feeding mechanism for feeding successive staples forwardly in a different plane, and means for inserting the forward staple into a fold on a short forward stroke.

71. In a machine for closing bags, folding mechanism for folding the material of the bag to form a closure, a plurality of stapling mechanisms arranged along the length of the fold, said stapling mechanisms each including a staple-forming device, means for feeding wire to the staple-forming device at an acute angle to the plane of the formed staple, and means for driving said wire feeding means and said staple-forming device including a member rotatable in a plane at right angles to the plane of the formed staple.

In testimony whereof I have signed this specification.

ISAAC W. LITCHFIELD.